(12) United States Patent
Park

(10) Patent No.: US 9,683,635 B2
(45) Date of Patent: Jun. 20, 2017

(54) POWER TRANSMISSION SYSTEM FOR HYBRID VEHICLE

(71) Applicant: Hyundai Motor Company, Seoul (KR)

(72) Inventor: Seong Ik Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 98 days.

(21) Appl. No.: 14/920,536

(22) Filed: Oct. 22, 2015

(65) Prior Publication Data

US 2016/0040758 A1  Feb. 11, 2016

Related U.S. Application Data

(62) Division of application No. 14/134,180, filed on Dec. 19, 2013, now abandoned.

(30) Foreign Application Priority Data

Oct. 10, 2013 (KR) .......................... 10-2013-0120882

(51) Int. Cl.
*F16H 3/66* (2006.01)
*B60K 6/365* (2007.10)
(Continued)

(52) U.S. Cl.
CPC ............... *F16H 3/66* (2013.01); *B60K 6/365* (2013.01); *B60K 6/387* (2013.01); *B60K 6/445* (2013.01); *B60K 6/547* (2013.01); *F16H 3/728* (2013.01); *B60K 6/543* (2013.01); *B60K 2006/381* (2013.01); *F16H 2037/0873* (2013.01);
(Continued)

(58) Field of Classification Search
CPC ........ B60K 6/365; B60K 6/387; B60K 6/445; B60K 6/543; B60K 6/547; B60K 2006/381; F16H 3/66; F16H 2200/2007; F16H 2200/2035
See application file for complete search history.

(56) References Cited

U.S. PATENT DOCUMENTS 2,914,967 A   12/1959   Simpson
7,387,585 B2   6/2008   Bucknor et al.
(Continued)

FOREIGN PATENT DOCUMENTS

JP   2008-174163 A   7/2008
KR   2007-0021445 A   2/2007
(Continued)

*Primary Examiner* — Derek D Knight
*Assistant Examiner* — David Morris
(74) *Attorney, Agent, or Firm* — Mintz Levin Cohn Ferris Glovsky and Popeo, P.C.; Peter F. Corless

(57) ABSTRACT

A power transmission system for a hybrid vehicle including an engine, a first planetary gearset and a second planetary gear set is provided. In particular, the first planetary gearset includes a plurality of first rotational elements, one of which is coupled with an output shaft of the engine and one of which is coupled with a first motor generator, and two of which are allowed to be directly selectively connected directly by a clutch. The second planetary gearset includes a plurality of second rotational elements, one of which is permanently coupled with one of the first rotational elements of the first planetary gearset, one of which is coupled with a second motor generator and one of which is connected directly with drive unit.

1 Claim, 7 Drawing Sheets

(51) Int. Cl.
- B60K 6/547 (2007.10)
- B60K 6/387 (2007.10)
- B60K 6/445 (2007.10)
- F16H 3/72 (2006.01)
- B60K 6/543 (2007.10)
- B60K 6/38 (2007.10)
- F16H 37/08 (2006.01)

(52) U.S. Cl.
CPC ............... *F16H 2200/2007* (2013.01); *F16H 2200/2035* (2013.01); *Y02T 10/6239* (2013.01); *Y10S 903/902* (2013.01)

(56) References Cited

U.S. PATENT DOCUMENTS

| | | | |
|---|---|---|---|
| 7,393,297 B2 | 7/2008 | Raghavan et al. | |
| 7,972,237 B2* | 7/2011 | Ota | B60K 6/365 180/65.7 |
| 8,370,034 B2 | 2/2013 | Kumazaki et al. | |
| 8,414,436 B2* | 4/2013 | Holmes | B60K 6/365 180/65.23 |
| 9,005,078 B2* | 4/2015 | Hayashi | B60K 6/365 477/5 |
| 9,333,848 B2* | 5/2016 | Ono | B60K 6/365 |
| 9,440,642 B2* | 9/2016 | Ono | B60K 6/445 |
| 2005/0221939 A1* | 10/2005 | Takami | B60K 6/365 475/5 |
| 2006/0111213 A1* | 5/2006 | Bucknor | B60K 6/445 475/5 |
| 2008/0125264 A1* | 5/2008 | Conlon | B60K 6/365 475/5 |
| 2009/0156351 A1* | 6/2009 | Brouwer | B60K 6/445 475/221 |
| 2012/0052999 A1 | 3/2012 | Kim et al. | |
| 2013/0072343 A1 | 3/2013 | Shim et al. | |
| 2014/0194238 A1* | 7/2014 | Ono | B60K 6/445 475/5 |
| 2014/0194239 A1* | 7/2014 | Ono | F16H 3/728 475/5 |
| 2014/0349809 A1* | 11/2014 | Kim | B60W 20/10 477/4 |
| 2015/0158484 A1* | 6/2015 | Sato | B60K 6/445 701/22 |
| 2016/0040758 A1* | 2/2016 | Park | B60K 6/365 475/323 |

FOREIGN PATENT DOCUMENTS

| | | |
|---|---|---|
| KR | 10-2010-0003747 A | 1/2010 |
| KR | 2010-0003747 A | 1/2010 |
| KR | 10-2011-0049398 A | 5/2011 |
| KR | 2011-0049398 A | 5/2011 |
| KR | 10-2012-0019855 A | 3/2012 |
| KR | 2012-0019855 A | 3/2012 |
| KR | 2012-0136640 A | 12/2012 |
| KR | 2012-0140099 A | 12/2012 |
| KR | 10-2013-0056640 A | 5/2013 |
| KR | 2013-0056640 A | 5/2013 |

\* cited by examiner

POWER TRANSMISSION SYSTEM FOR HYBRID VEHICLE

CROSS-REFERENCE TO RELATED APPLICATION

The present application is a divisional application of U.S. application Ser. No. 14/134,180, filed Dec. 19, 2013 which claims priority to Korean Patent Application No. 10-2013-0120882 filed on Oct. 10, 2013, the entire contents of which is incorporated herein for all purposes by this reference.

BACKGROUND OF THE INVENTION

Field of the Invention

The present invention relates, in general, to a hybrid vehicle having an electromechanical variable transmission (EVT), and, more particularly, to a power transmission system for a hybrid vehicle, which enables an invariable gear position in a high-speed low-load state using a plurality of planetary gearsets.

Description of the Related Art

Generally, hybrid vehicles are classified into two types: a parallel type and a power split type. The parallel type is divided into a flywheel mounted electric device (FMED) sub-type in which a motor is coupled to an engine and a transmission mounted electric device (TMED) type in which a clutch is coupled between an engine and a motor.

In the FMED type, since the motor is directly connected to the engine, the vehicle cannot run in an electric vehicle (EV) mode, and cannot employ a plug-in hybrid electric vehicle (PHEV) mode in which the vehicle can be charged via an external power source. The TMED sub-type is subjected to a loss of power caused by a change of speed while running in the EV mode, and inevitably employs an electric oil pump (EOP).

In the power split type, a planetary gearset is installed between an engine and a motor, and planetary gears serve as a transmission. In the case of the power split type, an electrical path for controlling a speed of the engine while running in a hybrid electric vehicle (HEV) mode is present during normal operation. The electrical path is a sort of power loss occurring because power from the engine is transmitted to a generator to charge the motor when transmitted from spinning wheels. This electrical path is unfavorable in view of running efficiency and fuel efficiency while running at high speed in the HEV mode.

Meanwhile, Korean Unexamined Patent Application Publication No. 2007-0021445 discloses a hybrid vehicle having a driving system in which a first planetary gearset and a generator are disposed on a first input shaft receiving rotational power from an engine, a motor is disposed on an axis parallel with the first input shaft, and an output from the first planetary gearset is reduced and transmitted to driving wheels through a differential. This hybrid vehicle configuration, however, has a complicated structure and unsatisfactory fuel efficiency.

Therefore, there is a need for a power transmission system for a hybrid vehicle that has a simple structure, supports EV and PHEV modes, allows an engine to be operated at an operating point on an optimum operating line (OOL), provides load leveling, and allows the engine to be directly coupled to a drive unit, all while providing high fuel efficiency while operating at high speed.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a power transmission system for a hybrid vehicle that has a simplified structure, supports EV and PHEV modes, allows an engine to be operated at a point on an optimum operating line (OOL), provides load leveling, and allows the engine to be directly coupled to a drive unit, all while providing high fuel efficiency while running at high speed.

In order to achieve the above object, according to one aspect of the present invention, there is provided a power transmission system for a hybrid vehicle, which includes: an engine of the hybrid vehicle; a first planetary gearset including a plurality of first rotational elements, one of which is coupled with an output shaft of the engine, one of which is coupled to a first motor generator respectively, and two of which are directly coupled by a clutch; and a second planetary gearset including of a plurality of second rotational elements, one of which is permanently coupled with one of the first rotational elements of the first planetary gearset, one of which is coupled with a second motor generator and one of which provides power to a drive unit.

Here, the first planetary gearset may include a first sun gear, a first ring gear, and a first carrier, and the second planetary gearset may include a second sun gear, a second carrier, and a second ring gear. The first sun gear of the first planetary gearset may be directly coupled with the first motor generator. Further, the first carrier of the first planetary gearset may be directly coupled with the output shaft of the engine, and the first carrier and the first ring gear of the first planetary gearset may be connected by the clutch, and are selectively coupled by the clutch accordingly. Additionally, the first ring gear of the first planetary gearset may be permanently and directly coupled with the second carrier of the second planetary gearset.

Also, in some exemplary embodiments of the present invention first ring gear of the first planetary gearset may be permanently coupled with the second ring gear of the second planetary gearset.

Alternatively, the first ring gear of the first planetary gearset may be permanently coupled with the second carrier of the second planetary gearset, and the second carrier of the second planetary gearset may be connected to the drive unit.

As yet another alternative, the first ring gear of the first planetary gearset may be permanently coupled with the second ring gear of the second planetary gearset, and the second ring gear of the second planetary gearset may be connected to the drive unit.

As to the second planetary gearset, the second sun gear of the second planetary gearset may be coupled with the second motor generator. The second carrier of the second planetary gearset may be connected to the drive unit. The second carrier of the second planetary gearset may be connected and fixed to a brake. The second ring gear of the second planetary gearset may be connected to the drive unit The second ring gear of the second planetary gearset may be connected and fixed to a brake as well.

As such, the clutch of the first planetary gearset may be coupled during high-speed driving at a high-speed gear position in order to allow the vehicle to run at an invariable gear position.

According to another aspect of the present invention, there is provided a power transmission system for a hybrid vehicle, which includes: an engine of the hybrid vehicle; a first planetary gearset including a first sun gear, a first carrier, and a first ring gear, of which the first sun gear is connected to a first motor generator, of which the first carrier is coupled with an output shaft of the engine, and of which the first ring gear and the first carrier are connected by a clutch so as for the clutch to be coupled to allow the vehicle to run using a variable gear position as an invariable gear position during high-speed low-load driving; and a second planetary gearset made up of a second sun gear, a second carrier, and a second ring gear, of which the second sun gear is connected to a second motor generator, of which the second carrier is connected to a drive unit and is permanently coupled with the first ring gear of the first planetary gearset, and of which the second ring gear is fixedly connected to a brake.

According to yet another aspect of the present invention, there is provided a power transmission system for a hybrid vehicle, which includes: an engine of the hybrid vehicle; a first planetary gearset made up of a first sun gear, a first carrier, and a first ring gear, of which the first sun gear is connected to a first motor generator, of which the first carrier is coupled with an output shaft of the engine, and of which the first ring gear and the first carrier are connected by a clutch so as for the clutch to be coupled to allow the vehicle to run using a variable gear position as an invariable gear position during high-speed low-load driving; and a second planetary gearset made up of a second sun gear, a second carrier, and a second ring gear, of which the second sun gear is connected to a second motor generator, of which the second carrier is fixedly connected to a brake, and of which the second ring gear is coupled with a drive unit and is permanently coupled with the first ring gear of the first planetary gearset.

Advantageously, according to the power transmission system for a hybrid vehicle having such a structure, the power transmission system is improved in fuel efficiency, compared to the conventional power transmission system. In particular it utilizes an improved configuration of a plurality of planetary gearsets and a clutch to allow the vehicle to run an EVT mode in which an unnecessary speed change is removed at a low or medium speed and to be driven using only an overdrive (OD) for an invariable gear position at a high speed, so that it can obtain an effect of improving the fuel efficiency during high speed driving such as on an expressway or highway.

Further, the engine and the drive unit are allowed to be directly coupled using the clutch, thereby improving the fuel efficiency in the event of high-speed driving. Driving forces of the engine and the motor are allowed to be appropriately used, so that it is possible to reduce a size of the motor and to reduce weight and production cost of the vehicle.

Therefore, with regard to the disadvantages of the FMED type of the two types applied to the conventional hybrid vehicle, i.e. making it impossible to employ the PHEV mode and inevitably employing the EOP due to the loss of power caused by the change of speed during running in the EV mode of the TMED type, the existing TMED type is used without a change to allow the vehicle to run in the EV mode, and the PHEV mode in which the vehicle can be charged via an external power source can be additionally applied. Due to the efficient use of the engine during driving, the engine can be operated at the operating point on the OOL, and load leveling is possible as well. As a result, it is possible to realize a hybrid vehicle that increases the power efficiency to improve the fuel efficiency and provides excellent driving capability.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, preferred embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
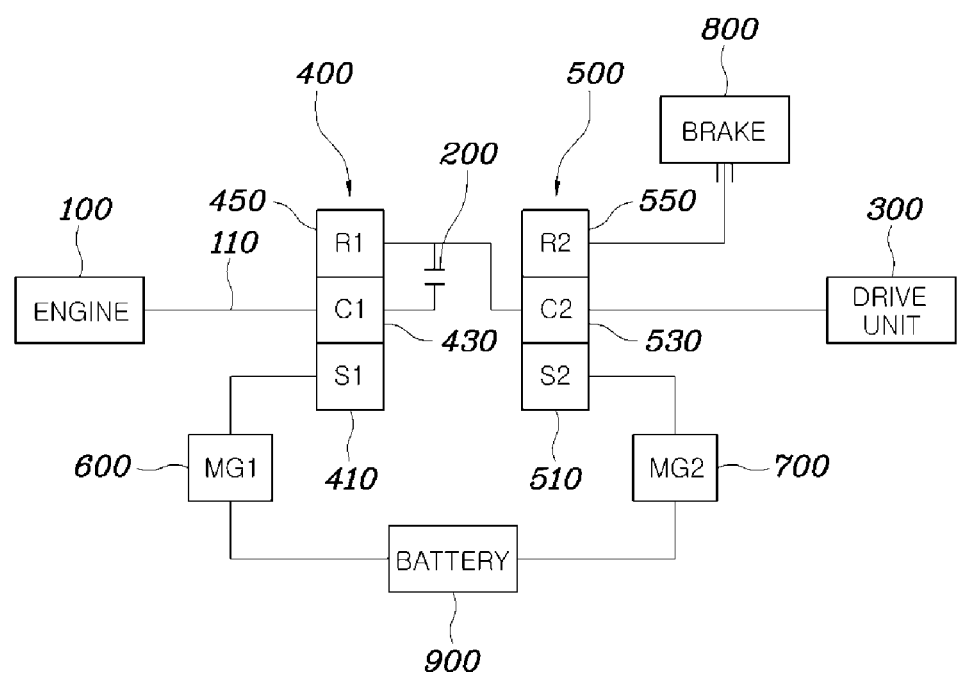
FIG. 1 shows a power transmission system for a hybrid vehicle according to an exemplary embodiment of the present invention.
Figure 2:
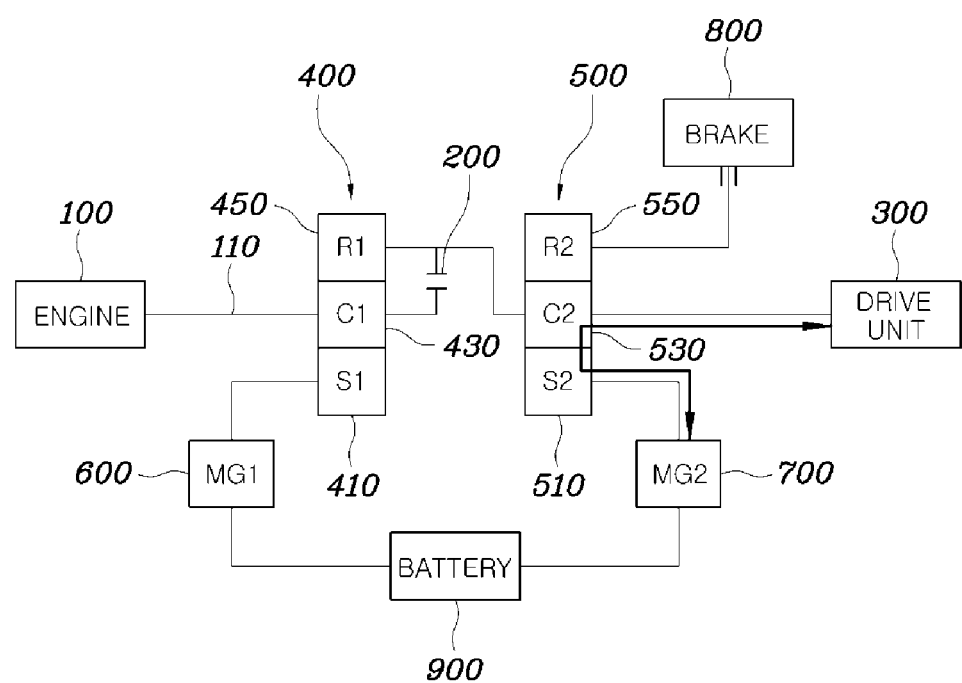
FIG. 2 shows an electric vehicle (EV) mode.
Figure 3:
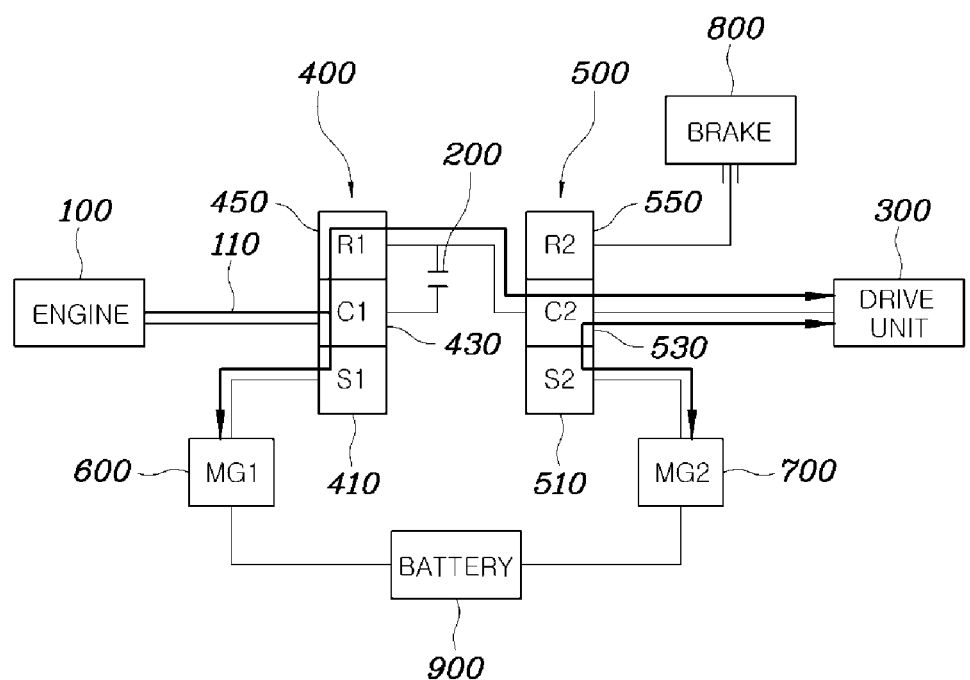
FIG. 3 shows an electromechanical variable transmission (EVT) mode.
Figure 4:
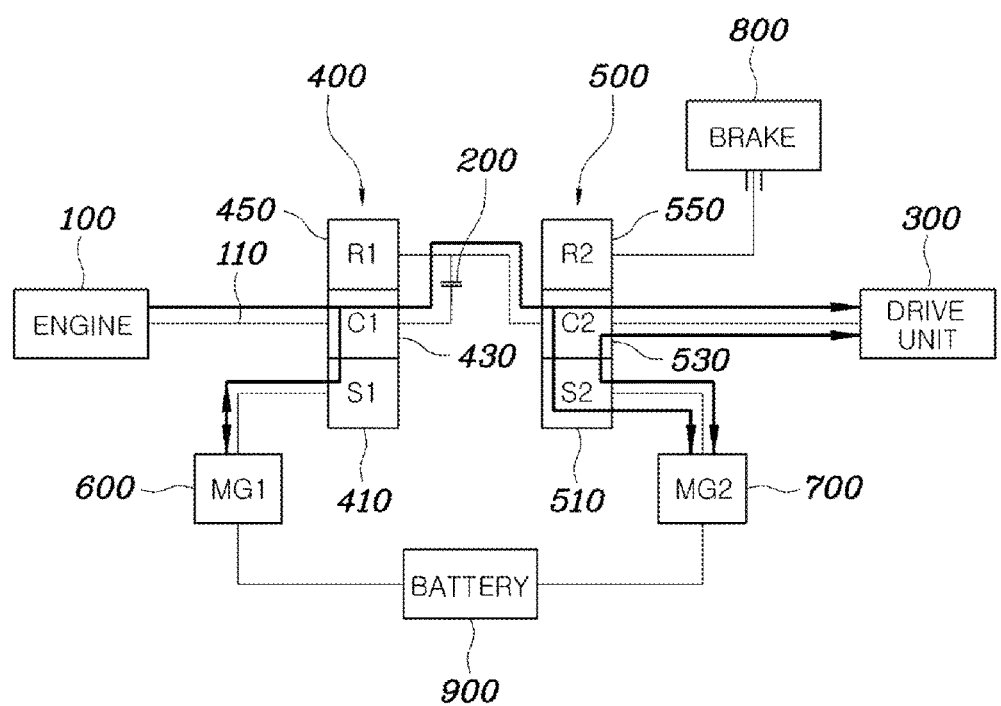
FIG. 4 shows an invariable gear position mode.
Figure 5:
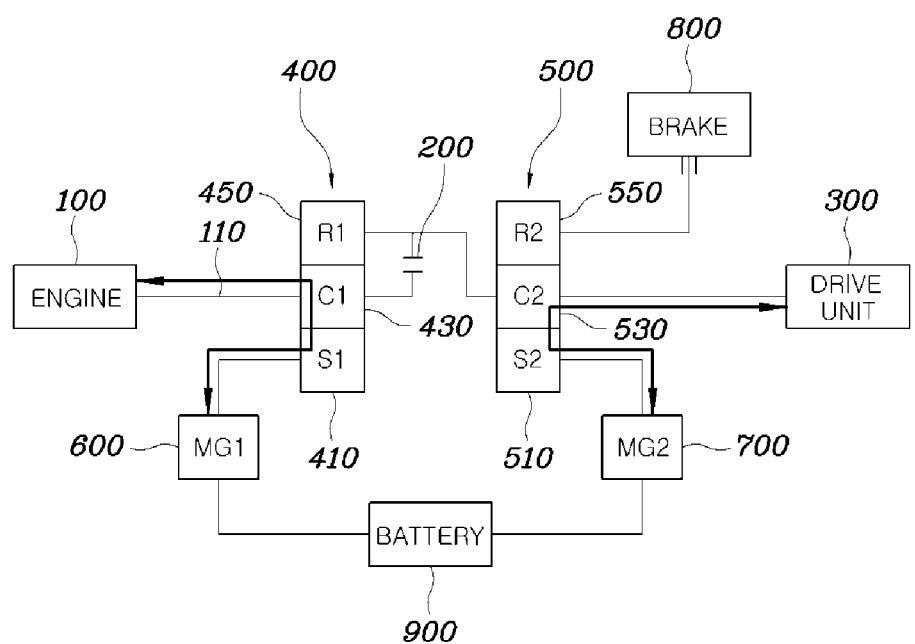
FIG. 5 shows a start or stop mode of an engine.
Figure 6:
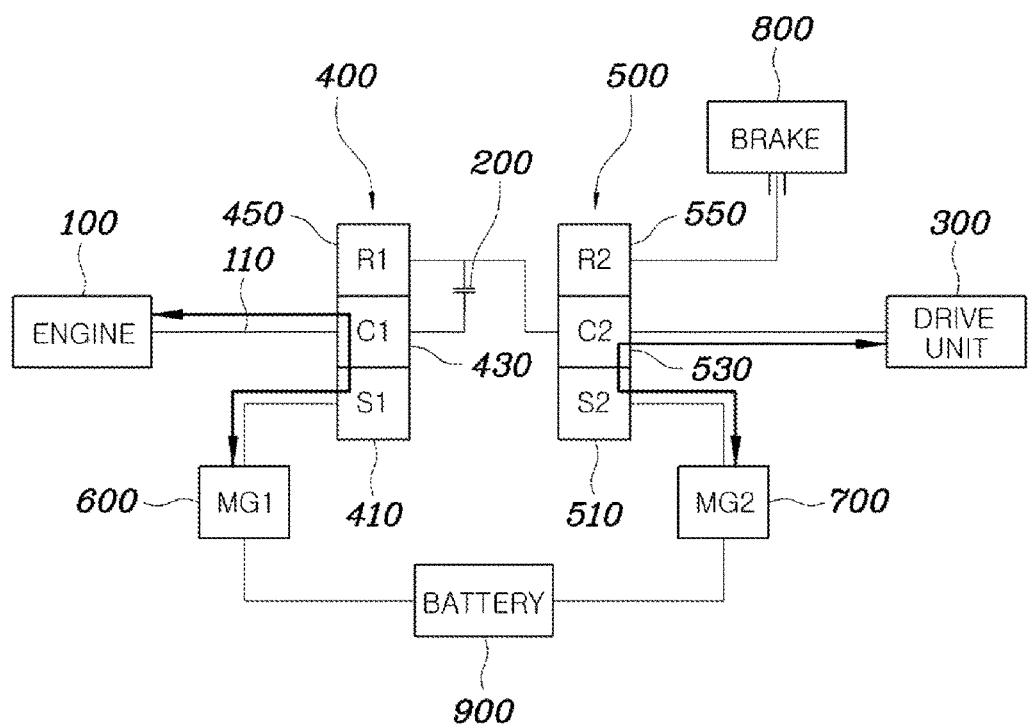
FIG. 6 shows a coupling mode of a clutch.

FIG. 1 shows a power transmission system for a hybrid vehicle according to an exemplary embodiment of the present invention. FIG. 2 shows an electric vehicle (EV) mode, and FIG. 3 shows an electromechanical variable transmission (EVT) mode. FIG. 4 shows an invariable gear position mode. FIG. 5 shows a start or stop mode of an engine 100. FIG. 6 shows a coupling mode of a clutch 200.

The present invention relates to an EVT of a hybrid vehicle, particularly a power split type hybrid vehicle. A power transmission system for a hybrid vehicle according to a preferred embodiment of the present invention includes: an engine 100 of the hybrid vehicle; a first planetary gearset 400 made up of a plurality of first rotational elements, one of which is coupled with an output shaft 110 of the engine, one of which is coupled to a first motor generator 600 respectively, and two of which can be directly coupled by a clutch 200; and a second planetary gearset 500 made up of a plurality of second rotational elements, one of which is permanently coupled with one of the first rotational elements of the first planetary gearset 400, one of which is coupled with a second motor generator 700 and one of which is directly connected to a drive unit 300. This configuration is shown in FIG. 1.

Here, the engine 100 serves as a driving force supply source or generator when the vehicle runs in a hybrid electric vehicle (HEV) mode. The first motor generator 600 serves to transmit power from the engine 100 to the drive unit 300 when the engine 100 is started/stopped or is in an EVT mode, and functions as a load leveling device. The second motor generator 700 is used as the driving force supply source when the vehicle runs in an EV mode, carries out regenerative braking, and runs in the HEV mode.

Further, the first planetary gearset 400 and the second planetary gearset 500 may be simple planetary gearsets that performs an EVT function of a power split type hybrid vehicle, allow an engine to be operated at an operating point on an optimum operating line (OOL), and function as motor decelerators assisting the first and second motor generators 600 and 700. The clutch 200 directly couples or decouples the engine 100 with or from the drive unit 300 in order to realize an invariable gear position, and serves to enhance efficiency when the vehicle is operating at a high speed. A brake 800 is in an ON state during normal operation, and fixes one of the second rotational elements of the second planetary gearset 500 (e.g., a second ring gear 550).

As can be seen from FIG. 1, the first motor generator 600 and the second motor generator 700 are connected to each other electrically through a battery 900 of the vehicle. The first motor generator 600 and the second motor generator 700 charge the battery 900 of the vehicle or are driven by electricity from the battery 900. The first planetary gearset 400, the clutch 200, and the second planetary gearset 500 are provided in place of a conventional transmission.

Each of the first planetary gearset 400 and the second planetary gearset 500 may have at least three rotational elements. In the present invention, the number of rotational elements is three, but is not limited to three. Therefore, the first planetary gearset 400 of the power transmission system for a hybrid vehicle according to the embodiment of the present invention is made up of a first sun gear 410, a first carrier 430, and a first ring gear 450, and the second planetary gearset 500 is made up of a second sun gear 510, a second carrier 530, and a second ring gear 550.

The first sun gear 410 of the first planetary gearset 400 is directly coupled with the first motor generator 600, and the first carrier 430 of the first planetary gearset 400 is directly coupled with the output shaft 110 of the engine 100. The first ring gear 450 of the first planetary gearset 400 is permanently coupled with the second carder 530 of the second planetary gearset 500.

In particular, the first carder 430 and the first ring gear 450 of the first planetary gearset 400 are coupled via the clutch 200, and the first carrier 430 and the first ring gear 450 are installed to be able to be directly coupled by the clutch 200. When the clutch 200 is engaged, the first planetary gearset 400 performs free wheeling (overdrive) in order to directly transmit a driving force generated from the engine 100 to the drive unit 300 without the generator, thereby removing an electrical path.

As stated above, the first ring gear 450 of the first planetary gearset 400 is permanently coupled with the second carrier 530 of the second planetary gearset 500. Additionally, the second carrier 530 of the second planetary gearset 500 is also directly coupled with the drive unit 300, and transmits the driving force to the drive unit 300 directly. The second sun gear 510 of the second planetary gearset 500 is coupled with the second motor generator 700, and the second ring gear 550 of the second planetary gearset 500 is coupled with the brake 800, and is typically maintained in a fixed state.

The clutch 200 provided for the first planetary gearset 400 is engaged to perform free wheeling (overdrive) in a high-speed low-load state in which the vehicle is driving on, for instance, an expressway, thereby maintaining a state such as continuing to maintain a highest gear position of an automatic transmission so that the vehicle can run at the invariable gear position to increase running efficiency. The clutch 200 thus can directly transmit the driving force generated from the engine 100 to the drive unit 300.

In detail, the power transmission system for a hybrid vehicle according to the embodiment of the present invention includes the engine 100 of the hybrid vehicle, the first planetary gearset 400 made up of the first sun gear 410, the first carrier 430, and the first ring gear 450, of which the first sun gear 410 is connected to the first motor generator 600, of which the first carrier 430 is coupled with the output shaft 110 of the engine, and of which the first ring gear 450 and the first carrier 430 are connected by the clutch 200 wherein the clutch 200 is engaged to allow the vehicle to run using a variable gear position as an invariable gear position during high-speed low-load driving, and a second planetary gearset 500 made up of the second sun gear 510, the second carrier 530, and the second ring gear 550, of which the second sun gear 510 is connected to the second motor generator 700, of which the second carrier 530 is connected to the drive unit 300 and is permanently coupled with the first ring gear 450 of the first planetary gearset 400, and of which the second ring gear 550 is fixedly connected to the brake 800.

Thus, an operation of the vehicle will be described in detail with reference to FIGS. 2 to 6. FIG. 2 shows an EV mode in which the engine 100 is not driven, and the vehicle runs only with electricity with the clutch 200 disengaged. Here, the driving force of the vehicle is transmitted to the drive unit 300 via the second sun gear 510 and second carrier 530 of the second planetary gearset 500 that reduces energy from the battery 900 and power generated from the second motor generator 700 because the second motor generator 700 acts as the electromechanical driving force during an EV mode.

Further, extra power from the drive unit 300 allows for regenerative braking in which such power is transmitted to the second motor generator 700 again and is stored in the battery 900 according to a running state of the vehicle such as a state in which the vehicle performs braking.

FIG. 3 shows an EVT mode in which the engine 100 is being driven, and the clutch 200 is still disengaged. In this case, the driving forces of the engine 100 and the battery 900 are transmitted to the drive unit 300 through the first and second motor generators 600 and 700 of the first and second planetary gearsets 400 and 500, and drive the drive unit 300 accordingly.

First, the driving forces of the battery 900 and the engine 100 are transmitted to the drive unit 300. If necessary, a part of the driving force generated from the engine 100 is transmitted to the drive unit 300 through the second carrier 530 of the second planetary gearset 500 which is permanently coupled with the first ring gear 450 of the first planetary gearset 400, and the remaining driving force drives the first motor generator 600 connected to the first sun gear 410 of the first planetary gearset 400. Thereby, the first motor generator 600 functions as a generator to generate electric energy, transmits the electric energy to the battery 900 or the second motor generator 700, and helps driving of the vehicle. Such energy is then used by the second motor generator 700 to provide power to the driving unit 330. The second motor generator 700 of FIG. 2 is operated in a mode similar to the EV mode.

FIG. 4 shows an invariable gear position mode in which the engine 100 is driven, and the clutch 200 is engaged. In this case, the vehicle can run in the EVT mode as an HEV, and also allow the engine to be operated at an operating point on the OOL. Typically, in this case, the vehicle is operating at high-speed low-load driving conditions, as on an expressway. Here, since the clutch 200 is engaged, the first planetary gearset 100 performs free wheeling (i.e., enters overdrive).

Therefore, the driving force generated from the engine 100 is transmitted in the same mode as the EVT mode of FIG. 3. However, since the first planetary gearset 400 performs free wheeling, the variable gear position is fixed to a fixed highest gear position or a higher gear position without changing a speed. In the invariable gear position mode of FIG. 4, the driving force of the engine 100 and driving forces from the first and second motor generators 600 and 700 are directly transmitted to the drive unit 300, thereby maximizing transmission efficiency. Here, the first and second motor generators 600 and 700 are operated in the same mode as the EVT mode.

FIG. 5 shows a start or stop mode of the engine 100 in which the engine 100 is driven or is not driven, and the clutch 200 is disengaged. In this mode, when the engine 100 is driven in the EV mode in which the vehicle is driven by the second motor generator 700 or is stopped in the EVT mode, rotating speeds of the drive unit 300 and the engine 100 are compared to control the rotating speed of the engine 100. Here, the second motor generator 700 is driven in the same mode as the EV mode or the EVT mode, and the first motor generator 600 is controlled to drive or stop the engine 100.

FIG. 6 shows a process in which the EV mode of FIG. 2 or the EVT mode of FIG. 3 is transited to the invariable gear position mode of FIG. 4, i.e. an engaged mode of the clutch 200. The engaged mode of the clutch 200 is applied to a case in which, when the clutch 200 is engaged after a speed of the first ring gear 450 of the first planetary gearset 400 is synchronized with a speed of the first motor generator 600 by the first motor generator 600 in order to drive the engine 100, or when an available driving force of the motor is insufficient, slip coupling for adjusting an amount of slip of the clutch 200 to transmit a torque of the engine 100 to a driving shaft is required.

More specifically, to drive the engine 100 when the vehicle is in the EV mode, the drive unit 300 is already being driven by the second motor generator 700, and the second planetary gearset 500 is being rotated at a specific speed by the second motor generator 700. In this case, the driving force of the engine 100 is required. To drive the engine 100, the engine 100 is driven by the first motor generator 600.

However, since the first planetary gearset 400 and the second planetary gearset 500 are permanently coupled, when the engine 100 is suddenly started, the speed of the first planetary gearset 400 is different from that of the second planetary gearset 500, and the speed difference generates an impact which could cause damage to the vehicle or inconvenience a user.

As such, when the engine 100 is started, when a mechanical oil pump (MOP) or an EOP is operated, when the synchronization of the speed is required, or when the clutch 200 should be engaged, a process of coupling the clutch 200 from the mode of FIG. 5 to the mode of FIG. 6 is performed.

When the vehicle requires a greater driving force during running in the EV mode, the engine 100 should be operated. This case will be described by way of example. After the EV mode of FIG. 2 is transited to the engaged mode of the clutch 200 of FIG. 6 via the start or stop mode of the engine 100 of FIG. 5, and then to the EVT mode of FIG. 3, the vehicle runs in the EVT mode in a high-speed low-load state. In this case, the vehicle runs in the invariable gear position mode of FIG. 3.

Figure 7:
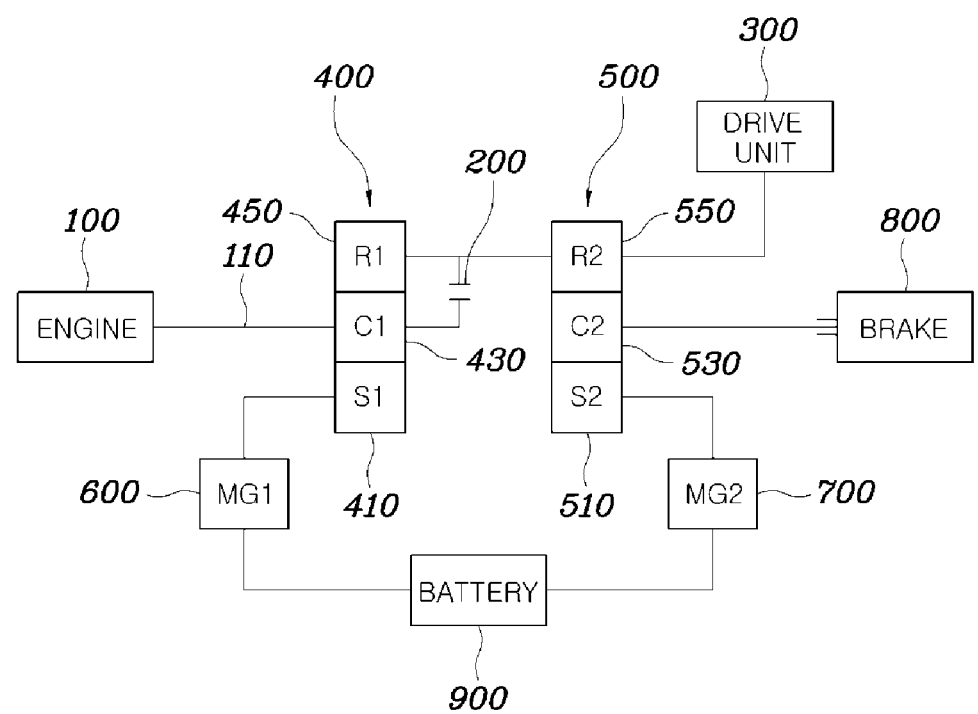
FIG. 7 shows a power transmission system for a hybrid vehicle according to another exemplary embodiment of the present invention.

FIG. 7 shows an alternative power transmission system for a hybrid vehicle according to another embodiment of the present invention. In particular, a power transmission system for a hybrid vehicle according to another embodiment of the present invention includes: an engine 100 of the hybrid vehicle; a first planetary gearset 400 made up of a first sun gear 410, a first carrier 430, and a first ring gear 50, of which the first sun gear 410 is coupled with a first motor generator 600, of which the first carrier 430 is coupled with an output shaft 110 of the engine, and of which the first ring gear 450 and the first carrier 430 are connected by a clutch 200 so as for the clutch 200 to be engaged to allow the vehicle to run at an invariable gear position during high-speed low-load driving, and a second planetary gearset 500 made up of the second sun gear 510, the second carrier 530, and the second ring gear 550, of which the second sun gear 510 is connected to a second motor generator 700, of which the second carrier 530 is fixedly connected to a brake 800, and of which the second ring gear 550 is coupled with a drive unit 300 and is permanently coupled with the first ring gear 450 of the first planetary gearset 400.

Thus, the present embodiment is different from the previous embodiment in that the first ring gear 450 of the first planetary gearset 400 is permanently coupled with the second ring gear 550 of the second planetary gearset 500, in that the second ring gear 550 of the second planetary gearset 500 is connected to the drive unit 300, and in that the second carrier 530 of the second planetary gearset 500 is connected and fixed to the brake 800. Both the present embodiment and the previous embodiment can obtain the object and effects of the present invention.

The power transmission system for a hybrid vehicle according to the present invention is improved in fuel efficiency, compared to the conventional power transmission system, and has the plurality of planetary gearsets and the clutch to allow the vehicle to run an EVT mode in which an unnecessary speed change is removed at a low or medium speed and to be driven using only an overdrive (OD) for an invariable gear position at a high speed, so that it can obtain an effect of improving fuel efficiency during running on an expressway.

Further, the engine and the drive unit are allowed to be directly coupled using the clutch, thereby improving the fuel efficiency in the event of high-speed driving. Driving forces of the engine and the motor are allowed to be used appropriately, so that it is possible to reduce the size of the motor and to reduce weight and production cost of the vehicle.

Therefore, with regard to the disadvantages of the FMED type of the two types applied to the conventional hybrid vehicle, i.e. making it impossible to employ the PHEV mode and inevitably employing the EOP due to the loss of power caused by the change of speed during running in the EV mode of the TMED type, the existing TMED type is used without a change to allow the vehicle to run in the EV mode, and the PHEV mode in which the vehicle can be charged via an external power source can be additionally applied. Due to the efficient use of the engine during driving, the engine can be operated at the operating point on the OOL, and load leveling is possible as well. As a result, it is possible to realize a hybrid vehicle that increases the power efficiency to improve the fuel efficiency and provides excellent driving capability.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A power transmission system for a hybrid vehicle comprising:
   an engine of the hybrid vehicle;
   a first planetary gearset made up of a first sun gear, a first carrier, and a first ring gear, of which the first sun gear is connected to a first motor generator, of which the first carrier is coupled with an output shaft of the engine, and of which the first ring gear and the first carrier are connected by a clutch wherein when the clutch is engaged, the vehicle operates using a variable gear position as an invariable gear position during high-speed low-load driving; and
   a second planetary gearset made up of a second sun gear, a second carrier, and a second ring gear, of which the second sun gear is connected to a second motor generator, of which the second carrier is fixedly connected to a brake, and of which the second ring gear is coupled with a drive unit and is permanently coupled with the first ring gear of the first planetary gear set.

* * * * *